April 23, 1940.   F. W. BERWICK ET AL   2,198,524
DEVICE FOR DELIVERING MEASURED QUANTITIES OF LIQUIDS
Filed Nov. 28, 1939   4 Sheets-Sheet 2

WITNESS:
Rob. R. Kitchel.

INVENTORS
Frederick William Berwick
and Albert George Berwick
BY Busser and Harding
ATTORNEYS.

April 23, 1940. F. W. BERWICK ET AL 2,198,524
DEVICE FOR DELIVERING MEASURED QUANTITIES OF LIQUIDS
Filed Nov. 28, 1939 4 Sheets-Sheet 3

WITNESS:

INVENTORS
Frederick William Berwick
and Albert George Berwick
BY
ATTORNEYS.

April 23, 1940. F. W. BERWICK ET AL 2,198,524
DEVICE FOR DELIVERING MEASURED QUANTITIES OF LIQUIDS
Filed Nov. 28, 1939 4 Sheets—Sheet 4

WITNESS:

INVENTORS
Frederick William Berwick
and Albert George Berwick
BY Busser and Harding
ATTORNEYS.

Patented Apr. 23, 1940

2,198,524

UNITED STATES PATENT OFFICE 2,198,524

DEVICE FOR DELIVERING MEASURED QUANTITIES OF LIQUIDS

Frederick William Berwick and Albert George Berwick, Streatham, London, England, assignors to The De Laval Separator Company, New York, N. Y., a corporation of New Jersey Application November 28, 1939, Serial No. 306,486
In Great Britain July 1, 1938

5 Claims. (Cl. 221—114)

This invention relates to devices for delivering measured quantities of liquids and has for its object to provide a device adapted to deliver a mixture of two or more liquids, one or all of which may be delivered in accurately measured quantities. The invention is particularly useful for dispensing beverages made up of a mixture of two or more liquids or of a solution of a syrup or other fluid in water.

The invention consists broadly stated in an arrangement comprising two or more liquid dispensing devices adapted to be operated by a reciprocating movement of an outlet member through which the liquid is delivered and a common delivery opening connected to the outlet members so that the dispensing devices are operated simultaneously when an upward thrust is applied to the common outlet member or to an operating member coupled thereto.

According to one form of the invention, two devices for delivering measured quantities of liquid each comprising a measuring chamber to which liquid is delivered from a bottle or other reservoir through a valve-controlled opening at the upper end of the chamber, and from which the liquid is discharged through a tubular reciprocable valve operating member projecting downwards from the measuring chamber, are mounted side by side in vertical positions upon a suitable bracket or other support.

The valve operating members are connected by means of rigid delivery tubes to a common mixing chamber located mid-way between the dispensing devices and at a point below the lower ends of the valve operating members, the said mixing chamber having a discharge opening at its lower end through which the mixed liquids are delivered to a vessel held beneath the mixing chamber.

The mixing chamber may be fitted with diametrically disposed arms or other abutment devices adapted to be engaged by a glass or vessel into which the mixed liquids are to be received so that the glass or other vessel can be used to push the mixing chamber upwards and thereby to actuate the valve operating members for the purpose of operating the two dispensing devices simultaneously. The mixing chamber may be guided by means of a rod fixed to the mixing chamber and adapted to slide in a guide fixed to the bracket to which the dispensing devices are secured.

In order to ensure proper closing of the valves controlling the outlet openings from both measuring chambers when the mixing chamber is retracted, the tubular valve operating members of the dispensing devices may be connected to the mixing chamber by means of joints which permit further downward movement of the mixing chamber after either valve operating member has reached the end of its stroke. Each valve is thus allowed to close independently of the other. These joints may be ball-and-socket or spigot joints and the parts of the joints may be held together by means of a light spring acting on the mixing chamber and tending to thrust it upwards. The pressure of this spring must, of course, be insufficient to lift either of the valves controlling the outlet openings from the measuring chamber.

A preferred embodiment of the invention will now be described with reference to the accompanying drawings in which.

Figure 1:
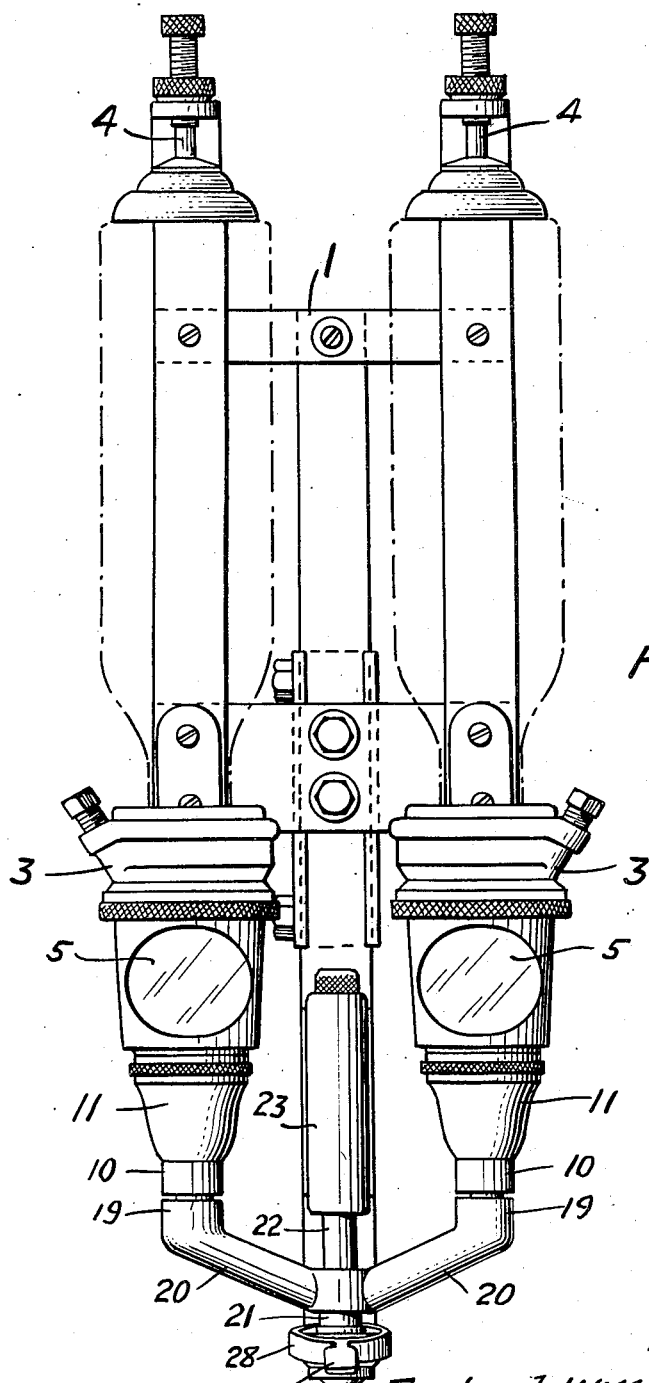
Figure 1 is a front elevation of a complete dispensing device, the storage vessels or bottles containing the liquids to be delivered being indicated by broken lines.
Figure 2:
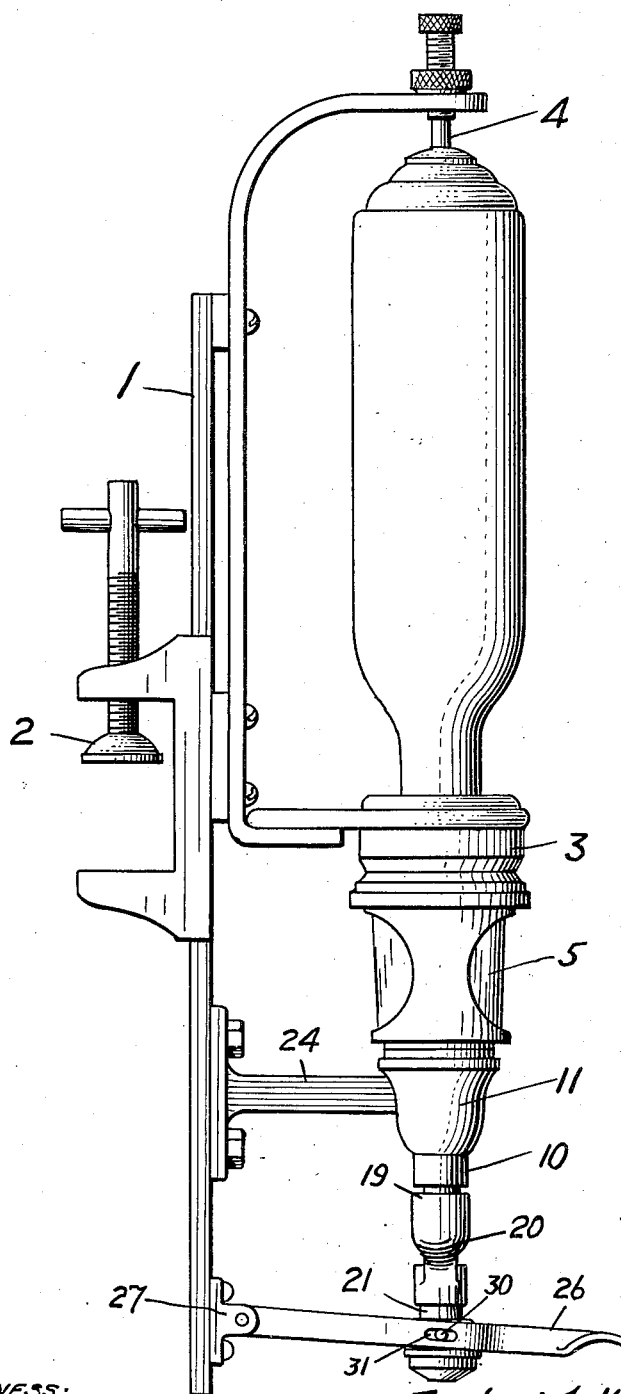
Figure 2 is a side elevation of the same.
Figure 3:
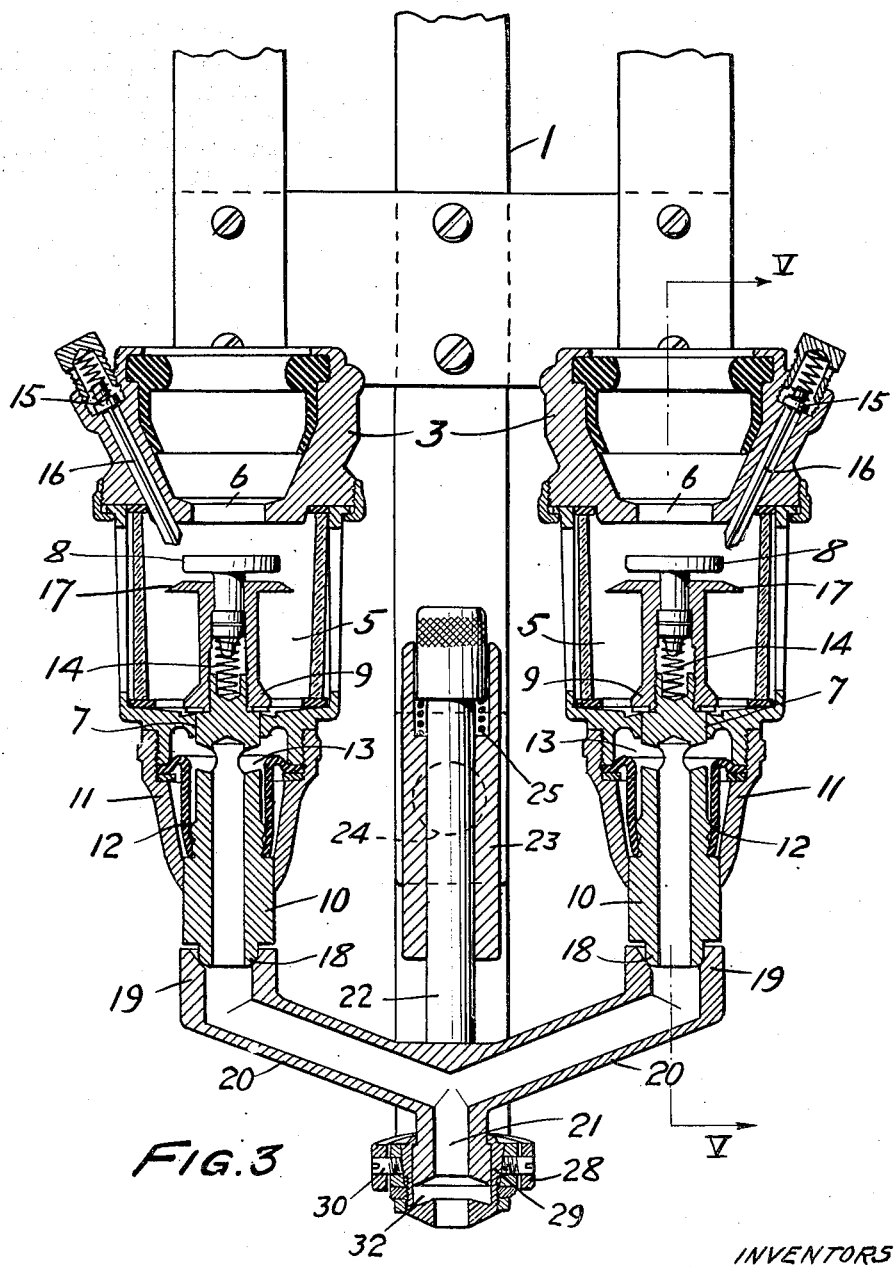
Figure 3 is an enlarged sectional front elevation of the dispensing apparatus, parts of the frame members being broken away.
Figure 4:
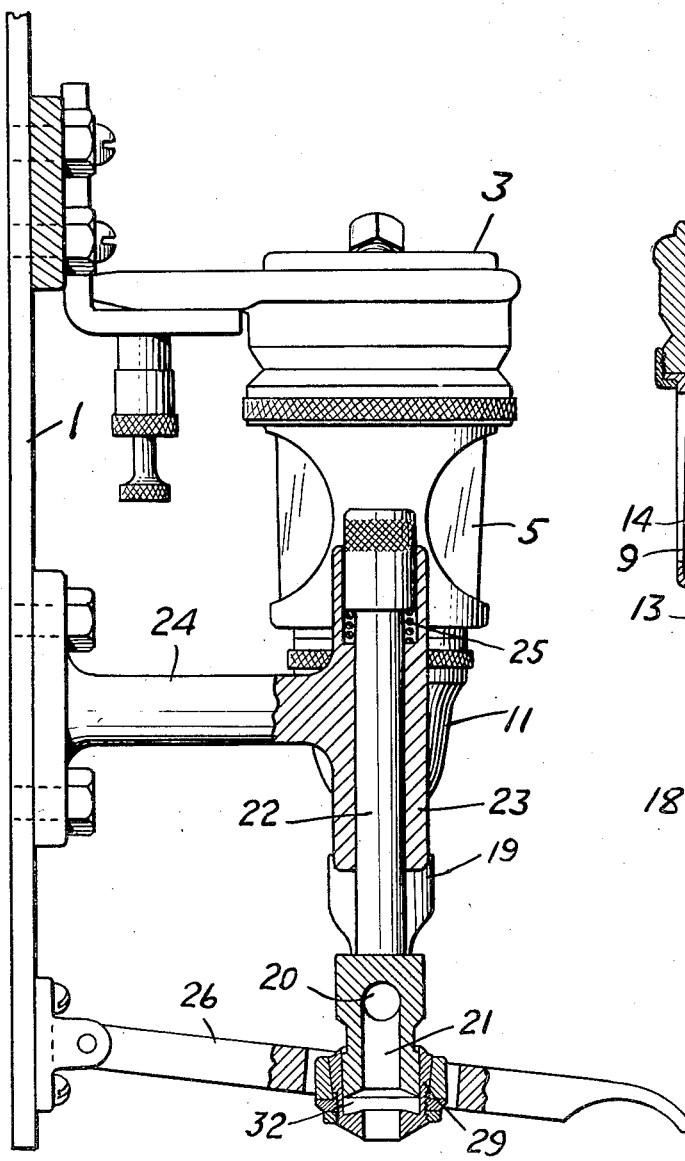
Figure 4 is a sectional side elevation of the apparatus shown in Figure 3.
Figure 5:
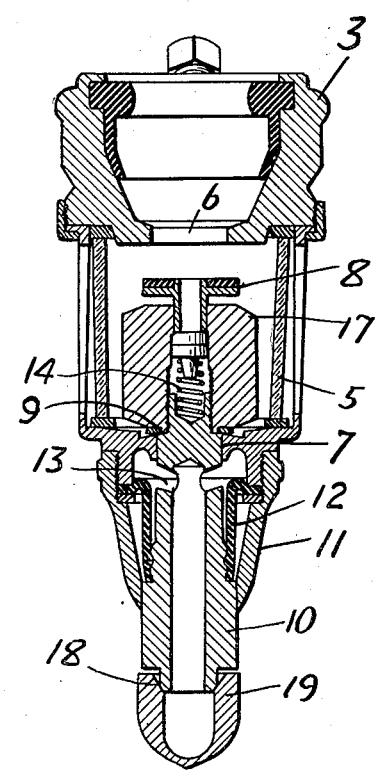
Figure 5 is a section on the line V—V of Figure 3.

The apparatus shown in the drawings comprises a metal frame indicated generally at 1 equipped with a clamp 2 by which the frame may be secured to a shelf or other support.

The frame 1 is intended to support two bottles or similar storage receptacles for the liquids to be dispensed, each bottle being supported in an inverted position.

Mounted side by side in front of the frame 1 are two measuring devices for delivering measured quantities of liquids, each of which is provided at its upper end with a socket 3 to receive the mouth of a bottle or like storage vessel for the liquid to be dispensed. The bottles are thus supported in inverted positions with their mouths engaging in the sockets 3. Adjustable clamping devices 4 are provided to engage the bottoms of the bottles so as to hold them firmly in position.

Each of the measuring devices as herein illustrated is so constructed as to embody the invention set forth in the patent to Ransom and Berwick, No. 2,093,365, dated September 14, 1937 and comprises a measuring chamber 5 provided at its upper end with an inlet opening 6 communicating with the socket 3 and at its lower end with an outlet opening 7. The opening 6 is controlled by an inlet valve 8 and the opening 7 is controlled by a valve 9, both of which valves are mounted on a hollow plunger 10 which projects downwards through the opening 7 and through a gland or sealing chamber 11 attached to the lower end of the measuring chamber. The sealing member of the gland or sealing chamber consists of a flexible rubber sleeve 12 which also acts as a control spring tending to move the plunger 10 downwards to the position shown. The plunger 10 has a central bore which is open at its lower end and communicates at its upper end with lateral ports 13 cut through the wall of the plunger 10 so that when the valve 9 is closed these ports open into the interior of the chamber 11. Thus when the valve 9 is lifted the opening 7 is at first obstructed by the plunger 10. The valve 8 is slidably mounted relatively to the plunger 10 and is controlled by a spring 14 and the parts are so arranged that when the plunger 10 is pushed upwards, so that the valve 9 is lifted, the plunger 10 continues to obstruct the opening 7 until the valve 8 has been brought against its seat. Further upward movement of the plunger 10 then causes the lateral opening 13 to enter the measuring chamber so as to allow the measured quantity of liquid trapped therein to escape through the openings 13 and through the hole of bore in the plunger 10, the spring 14 being compressed during this further movement. A spring-loaded air inlet valve 15 controlled by a push rod 16 is provided for the purpose of admitting air to the measuring chamber during the process of discharging the measured quantity of liquid, this air inlet valve being controlled by a shoulder 17 fixed to the valve 9 and arranged so that the shoulder 17 engages the push rod 16 and opens the air inlet valve after the valve 8 has been closed.

The plungers 10 are formed at their lower ends with spigots 18 which engage in sockets 19 formed on the ends of the two arms 20 of a V-shaped pipe having a short stem 21 provided with a mixing chamber therein, the V-shaped pipe and stem forming a Y-shaped pipe. This Y-shaped pipe is fixed to a rod 22 slidably mounted in a tubular guide member 23 fixed in a vertical position between the measuring chambers, this guide tube being supported by a bracket 24 fixed to the frame 1. The rod 22 is slidable in the tube 23 and is controlled by a light spring 25 which tends to lift the rod 22. The pressure of the spring 25 is sufficient to overcome the weight of the rod 22 and the Y-shaped pipe carried thereby so as to hold the sockets 19 firmly in engagement with the spigots 18, but is insufficient to lift either of the valves 9.

The Y-shaped pipe is adapted to be pushed upwards for the purpose of opening the plungers 10 by means of a lever 26 pivoted to a bracket 27 fixed to the frame 1. The lever 26 is formed with a ring-shaped part 28 which embraces the stem 21 of the Y-shaped pipe and is coupled to a part 29 by means of pins 30 on the part 29 engaging in slots 31 in the lever 26. The part 29 is a drip collecting device provided for the purpose of preventing the delivery pipe 21 from dripping in the intervals between successive operations. The part 29 has a limited sliding movement relatively to the stem 21 and is arranged so that when the lever 26 is released a chamber 32 is formed for the collection of drips which might otherwise fall from the stem 21.

This drip-collecting chamber is described in the aforementioned patent.

In the use of the apparatus, the measuring chambers 5 are normally full of liquid, the parts being in the positions shown in the drawings, so that the outlets 7 from the measuring chambers are closed by the valves 9.

When it is desired to dispense measured quantities of liquids, the lever 26 is pushed upwards so that an upward movement is communicated to the Y-shaped pipe and thence to the plungers 10. The first part of the upward movement of each plunger 10 causes the valve 8 to close so that the measuring chamber 5 is cut off from the main supply. Further upward movement of the plunger 10 then causes the openings 13 to enter the measuring chamber and the air inlet valve 15 to open. The measured quantities of liquid then flow by gravity through the plungers 10 and branch pipes 20 and are discharged through the common stem 21 into a drinking glass or other vessel held beneath the latter.

When the measured quantities of liquid have been completely discharged, the operator releases the lever 26, thus allowing the plungers 10 to return to their original positions under the action of the sleeves 12. The measuring chambers 5 are then refilled with liquid through the inlet openings 6, the displaced air rising into the bottles or storage chambers through the openings 6.

It is to be noted that the branches 20 of the Y-shaped pipe shown in the drawings are of somewhat larger bore than the valve operating members 10. This results in a fall of pressure at the point where the liquid flows from the plunger 10 into the branch pipe 20. The liquid pressure at the joint is thus reduced and risk of leakage is greatly minimised.

If desired the parts 10 may be tightly jointed to the branches 20 of the Y-shaped pipe, or joints between these parts may be avoided altogether by making the parts 10 integral with the parts 20. The particular advantage of the joints described and shown in the drawings, however, is that these joints permit the valves 9 to seat independently of one another and prevent risk of leakage in case one of the valves 9 should seat slightly before the other. In such case the joint between the parts 10 and 20 permits slight additional downward movement of the Y-shaped pipe after one of the valves 9 is seated, thus permitting the other valve 9 to seat properly. When the Y-shaped pipe is pushed upwards for the purpose of opening the valves 9 the joints between the parts 10 and 20 are both firmly closed by the pressure of the sleeves 10 which act individually on the two joints.

Although we have described an apparatus fitted with two dispensing devices and adapted to deliver measured quantities of two liquids it is to be understood that the device may be adapted to deliver measured quantities of three or more liquids by providing three or more measuring chambers and substituting a pipe having three or more branches for the Y-shaped pipe described and illustrated. The branch pipe will have a separate branch for each measuring device and these branches may be arranged to discharge through a common stem similar to the stem 21 or they may be provided with two or more discharge openings arranged sufficiently close together to enable them to discharge into a common drinking glass or receptacle.

Provision may be made for operating the device by upward pressure of the receptacle to be filled instead of by the lever 26. For this purpose the part 29 may be fitted with diametrically disposed arms or other abutment members similar to those shown in the aforementioned patent adapted to be engaged by the rim of a glass or other vessel into which the mixed liquids are to be received so that the said vessel can be used to push the mixing chamber upwards and thereby to actuate the valve operating members for the purpose of operating the dispensing device.

Although we have described forms of construction of our invention embodying two dispensing devices having measuring chambers it is within the scope of our invention to employ only one dispensing device of the measuring chamber type. The other dispensing device may embody a simple valve which permits a continuous flow of liquid from a water main or other source whilst the measured quantity is being dispensed from the first dispensing device. A pressure reducing device of some kind is fitted if necessary to regulate the flow of the liquid delivered from the water main or other source so as to adjust the quantity of such liquid which is delivered into the glass or other receiving vessel during the process of delivering the measured quantity of liquid from the dispensing device fitted with the measuring chamber.

We claim:

1. Apparatus for delivering measured quantities of liquids comprising a plurality of dispensing devices each of which comprises an outlet member which is movable to allow delivery of liquid therethrough, and means to simultaneously so move said outlet members, said means comprising a V-shaped pipe, the corresponding ends of which register with said outlet members and the other ends of which communicate with a common delivery opening, said means being movable upwardly to thereby so simultaneously move said outlet members and thus effect the discharge of liquid therethrough and through said V-shaped pipe to the common delivery opening.

2. Apparatus for delivering measured quantities of liquids comprising two liquid measuring chambers, each comprising inlet and outlet valves and a tubular operating member controlling said valves and projecting downward from the measuring chamber and arranged so that a measured quantity of liquid is delivered through the operating member when the latter is pushed upwards, a common mixing chamber provided with an outlet and disposed below the measuring chambers, and branch pipes connecting the tubular operating members with the common mixing chamber, the latter being adapted to be pushed upwards to thereby push the operating members of both chambers upwards and thus effect the simultaneous discharge of measured quantities of the two liquids to the mixing chamber and out the outlet therefrom.

3. Apparatus according to claim 2 comprising also a Y-shaped pipe the stem of which forms the mixing chamber, a vertically slidable member attached to said pipe, and means supporting said slidable member between the two liquid measuring chambers.

4. Apparatus according to claim 1 comprising spigots on said outlet members which engage in sockets in said delivery means.

5. Apparatus for delivering measured quantities of liquids comprising two liquid measuring chambers, each comprising inlet and outlet valves and a tubular operating member controlling said valves and projecting downward from the measuring chamber and arranged so that a measured quantity of liquid is delivered through the operating member when the latter is pushed upwards, a common mixing chamber provided with an outlet and disposed below the measuring chambers, and branch pipes connecting the tubular operating members with the common mixing chamber, the latter being adapted to be pushed upwards to thereby push the operating members of both chambers upwards and thus effect the simultaneous discharge of measured quantities of the two liquids to the mixing chamber and out the outlet therefrom, the liquid channels in the pipes connecting the tubular operating members with the common mixing chamber being of greater diameter than the liquid channels in the tubular operating members so that a fall of liquid pressure is produced for the purpose described.

FREDERICK WILLIAM BERWICK.
ALBERT GEORGE BERWICK.